(12) United States Patent
Chan et al.

(10) Patent No.: US 6,652,159 B2
(45) Date of Patent: Nov. 25, 2003

(54) ENHANCED OPTICAL TRANSCEIVER ARRANGEMENT

(75) Inventors: Benson Chan, Vestal, NY (US); Paul F. Fortier, Richelieu (CA); Francois Guindon, San Diego, CA (US); Glen Walden Johnson, Yorktown Heights, NY (US); Joseph Kuczynski, Rochester, MN (US); Gerald Daniel Malagrino, Jr., Rochester, MN (US); James Robert Moon, Oronoco, MN (US); David Roy Motschman, Rochester, MN (US); John Henry Sherman, Lisle, NY (US)

(73) Assignee: International Business Machines Corporation, Armonk, NY (US)

( * ) Notice: Subject to any disclaimer, the term of this patent is extended or adjusted under 35 U.S.C. 154(b) by 154 days.

(21) Appl. No.: 09/894,934

(22) Filed: Jun. 28, 2001

(65) Prior Publication Data

US 2003/0002824 A1 Jan. 2, 2003

(51) Int. Cl.⁷ ................................................ G02B 6/42
(52) U.S. Cl. ........................................ 385/92; 359/163
(58) Field of Search ........................... 385/14, 88–94, 385/139, 163; 359/163

(56) References Cited

U.S. PATENT DOCUMENTS

| | | | |
|---|---|---|---|
| 3,387,252 A | 6/1968 | Rothweiler | 339/38 |
| 4,640,575 A | 2/1987 | Dumas | 350/96.2 |
| 4,767,179 A | 8/1988 | Sampson et al. | 350/96.2 |
| 4,779,950 A | 10/1988 | Williams | 350/96.21 |
| 4,795,354 A | 1/1989 | Owen | 439/137 |
| 4,979,792 A | 12/1990 | Weber et al. | 350/96.2 |
| 5,047,835 A * | 9/1991 | Chang | 257/433 |
| 5,202,949 A | 4/1993 | Hileman et al. | 385/134 |

(List continued on next page.)

FOREIGN PATENT DOCUMENTS

| | | | |
|---|---|---|---|
| JP | 6333634 | 12/1994 | H01R/13/52 |
| JP | 7235881 | 9/1995 | H04B/1/034 |
| JP | 8262271 | 10/1996 | G02B/6/36 |
| JP | 9178995 | 7/1997 | G02B/6/44 |
| JP | 9297244 | 11/1997 | G02B/6/36 |
| JP | 10048465 | 2/1998 | G02B/6/36 |
| JP | 11231146 | 8/1999 | G02B/6/00 |
| JP | 00147328 | 5/2000 | G02B/6/42 |

OTHER PUBLICATIONS

U.S. patent application Ser. No. 09/893,812, attorney docket No. ROC920010118US1, entitled Processing Protective Plug Insert for Optical Modules, Benson Chan, et al.

U.S. patent application Ser. No. 09/894,714, attorney docket No. ROC920010151US1, entitled Enhanced Optical Coupler, Benson Chan, et al.

Primary Examiner—Robert H. Kim
Assistant Examiner—Krystyna Suchecki
(74) Attorney, Agent, or Firm—Rabin & Berdo, PC; Robert H. Berdo, Jr.

(57) ABSTRACT

An optical transceiver arrangement includes a retainer assembly. The retainer assembly includes at least one housing adapted to be coupled to a fiber optic cable, and at least one carrier assembly having a carrier, and a die chip attached to the carrier. The die chip has at least one active region. The optical transceiver arrangement further includes at least one optical coupler disposed within the housing for optically coupling the at least one active region to the fiber optic cable. The optical transceiver arrangement also includes a laminate assembly having the retainer assembly disposed thereon. The die chip is electrically coupled to the laminate assembly.

33 Claims, 7 Drawing Sheets

U.S. PATENT DOCUMENTS

| | | | | |
|---|---|---|---|---|
| 5,233,674 A | * | 8/1993 | Vladic | 385/56 |
| 5,243,678 A | | 9/1993 | Schaffer et al. | 385/134 |
| 5,333,225 A | | 7/1994 | Jacobowitz et al. | 385/93 |
| 5,347,604 A | * | 9/1994 | Go et al. | 385/92 |
| 5,499,311 A | | 3/1996 | DeCusatis | 385/89 |
| 5,561,727 A | * | 10/1996 | Akita et al. | 385/88 |
| 5,689,599 A | | 11/1997 | Shahid | |
| 5,764,833 A | | 6/1998 | Kakii et al. | |
| 5,967,189 A | | 10/1999 | Cheng | 138/89 |
| 6,088,502 A | | 7/2000 | Faist et al. | 385/134 |
| 6,210,047 B1 | | 4/2001 | Grois et al. | |
| 6,259,856 B1 | | 7/2001 | Shahid | |
| 6,431,765 B1 | * | 8/2002 | Chen et al. | 385/92 |
| 2003/0007717 A1 | * | 1/2003 | Chiappetta et al. | 385/14 |

* cited by examiner

ENHANCED OPTICAL TRANSCEIVER ARRANGEMENT

CROSS REFERENCE TO RELATED APPLICATIONS

The subject matter of this application is related to the disclosure contained within U.S. patent application Ser. No. 09/894,714, entitled Enhanced Optical Coupler; and U.S. patent application Ser. No. 09/893,812, entitled A Processing Protective Plug Insert for Optical Modules, and assigned to International Business Machines Corporation, all filed concurrently herewith.

BACKGROUND OF THE INVENTION

1. Field of the Invention

The present invention relates to an enhanced optical transceiver arrangement, and in particular, to an enhanced optical transceiver arrangement that can be optically coupled with an optical fiber ribbon for receiving and transmitting optical signals thereto and therefrom.

2. Background Information

Computer and communication systems are now being developed in which optical devices, such as optical fibers, are used as a conduit (also known as a wave guide) for modulated light waves to transmit information. These systems typically include a light emitter or a light detector optically connected to the optical fibers. A typical light emitter may be a so-called edge emitter, or a surface emitter, such as a vertical cavity surface emitting laser (VCSEL). A typical light detector may be a photodiode. A generic term of either a light emitter or a light detector is an "optoelectronic transducer." A generic term for a light emitter and a light detector arrangement is an optical transceiver. The optical fibers, which collectively form a fiber-optic cable or ribbon, are typically coupled to the respective light detector and the light emitter, so that optical signals can be transmitted back and forth, for example.

As an example, optoelectronic transducers convert electrical signals to or from optical signals; the optical signals carry data to a receiver (light detector) from a transmitter (light emitter) at very high speeds. Typically, the optical signals are converted into, or converted from, the associated electrical signals using known circuitry. Such optoelectronic transducers are often used in devices, such as computers, in which data must be transmitted at high rates of speed.

The conventional light emitter allows for integrated two-dimensional array configurations. For example, the active regions of a conventional VCSEL can be arranged in a linear array, for instance 12 active regions spaced about 250 microns apart, or in area arrays, for example, 16×16 arrays or 8×8 arrays. Of course, other arrangements of the arrays are also possible. Nevertheless, linear arrays are typically considered to be preferable for use with optoelectronic transducers, since it is generally considered easier to align the optical fibers that collect the light emitted from the VCSELs in a linear array, than in an area array. Moreover, it is also possible to utilize the active regions singly, i.e., without being arranged in an array.

The optoelectronic transducers are normally located on either input/output cards or port cards that are connected to an input/output card. Moreover, in a computer system, for example, the input/output card (with the optoelectronic transducer attached thereto) is typically connected to a circuit board, for example a mother board. The assembly may then be positioned within a chassis, which is a frame fixed within a computer housing. The chassis serves to hold the assembly within the computer housing.

Typically, each optical fiber of the ribbon is associated with a respective active region. Further, it is conventional for the ends of the optical fibers of the ribbon to terminate in a fiber connector. Such fiber connectors usually have an industry standard configuration, such as the MTP® fiber connectors manufactured by US Conec, Ltd. of Hickory, N.C. However, fiber connectors having the industry standard configuration are not suitable for connecting directly with the sensitive active regions of the typical light emitters or light detectors. Should direct contact occur between the respective active regions and the fiber connector, the fiber connector would likely damage the active regions, causing the light emitter or light detector to become inoperative. It is thus conventional to space the fiber connector away from the active regions. However, as will be appreciated, by providing a space, it thus becomes desirable to provide a way of optically coupling the active regions with the fiber connector, so that the optical signals can be accurately and efficiently transmitted therebetween.

One conventional manner of optically coupling the active regions with the fiber connector is to provide a lens assembly in the space therebetween. However, lens assemblies tend to be complicated and expensive. Thus, it is also known to provide a fiber optic coupler between the active regions and the fiber connector. However, the conventional fiber optic coupler has a limited length, due to manufacturing constraints. Thus, the known fiber connectors must be positioned relatively close to the active regions, which may limit design options.

Moreover, the typical optical transceiver arrangement utilizes separate modules for both the light emitter and light detector, thus requiring a substantial amount of board space. Further, such separate modules are often difficult to assemble in the tight confines provided. Thus, it is desirable to provide an optical transceiver arrangement that does not occupy much space. Moreover, it is further desirable to provide an optical transceiver arrangement that is relatively easy to assemble and place in its desired location. Additionally, it is desirable to provide an optical transceiver arrangement in which the light emitter and the light detector are provided in the same package.

SUMMARY OF THE INVENTION

It is, therefore, a principal object of this invention to provide an enhanced optical transceiver arrangement.

It is another object of the invention to provide an enhanced optical transceiver arrangement that solves the above mentioned problems.

These and other objects of the present invention are accomplished by the enhanced optical transceiver arrangement disclosed herein.

According to one aspect of the invention, the optical transceiver arrangement is formed from a plurality of interconnected subassemblies. One of the subassemblies is a retainer assembly, which includes a retainer and a carrier assembly. The carrier assembly includes a die carrier, having opposing lands. The opposing lands have a receiving space therebetween, in which either a light emitter die chip or light detector die chip (hereinafter referred to collectively as a die chip) is disposed.

The carrier is preferably manufactured from a conductive material, so that it can serve as a ground for the die chip. For example, the carrier can be formed from copper, and be gold plated to enhance its conductivity and reduce its susceptibility to oxidation.

The carrier further has spaced apart feet, which can be attached to a further subassembly of the optical transceiver arrangement, as will be subsequently described. The feet provide a space under the carrier in which other components can be disposed.

Each land is adapted to allow an optical coupler to be attached thereto. The optical coupler is adapted to optically couple active regions of the light emitter or light detector with a fiber connector (i.e., an industry standard connector attached to an end of an optical fiber ribbon), so that optical signals can be accurately transmitted therebetween. For example, each land can be provided with a receiving hole, which receives a corresponding alignment pin of the optical coupler in a clearance type fit.

The optical coupler includes at least two plates disposed in a superposed relationship. At least one of the plates, or alternatively both of the plates, has a plurality of spaced apart narrow grooves formed in a surface thereof, each of which extends from one end face to another end face of the plates. Each of the narrow grooves has an optical fiber disposed therein, i.e., a fiber that is separate and distinct from the optical fibers of the ribbon. Further, the plate or plates may have a plurality of wide grooves formed in the surface. Each wide groove extends from a respective end face toward an intermediate portion of the plate or plates, for example. Each of the wide grooves has an alignment pin disposed therein. When the plates are joined together in the superposed relationship, the narrow grooves form through holes for the respective optical fibers, and the wide grooves form wide holes for the alignment pins. When formed, each of the optical fibers of the optical coupler are alignable with respective ones of the active regions of the die chip, respective ones of the alignment pins are insertable into the receiving holes in the lands of the carrier, and respective other ones of the alignment pins are engagable with the fiber connector.

The optical fibers of the optical coupler may be actively aligned with the active regions, so as to ensure that the emitted light does not partially or completely "miss" its intended target. Thereafter, a UV curable adhesive, for example, could be used to fix the respective alignment pins in the respective receiving holes in the lands, thereby locking the optical coupler in alignment with the active regions of the die chip.

After alignment, an epoxy, for example, can be used to seal the exterior edges of the optical coupler to the surface of the die chip. The epoxy may have a sufficiently high viscosity so as to prevent the epoxy from flowing into the gap between the edge of the optical coupler and the active regions of the die chip. Thus, a sealed air gap will be formed between the ends of the optical fibers in the coupler and the active regions to allow for the transmission of light, while preventing contaminants from entering this space.

The carrier assembly further includes a flex cable that is electrically coupled to the die chip. The flex cable has both ground wires (or a ground layer) and signal wires which may be covered by an insulating coating, such as plastic. The insulating coating may be removed in a region at one end of the flex cable, to form one or more "windows" which expose the signal wires, grounds wires or both as they pass through the space of the windows. For example, if the flex cable is provided with two windows, one disposed over the other, the lower window can be adapted to expose the ground wires, to allow the ground wires to be electrically coupled to the conductive carrier. The upper window can then be adapted to expose the signal wires, which can then be electrically coupled to the die chip. This arrangement works well when the die chip is attached and directly grounded to the carrier. Alternatively, if the die chip is not directly grounded to the carrier, then the flex cable can be provided with only one window, which is adapted to expose both the ground wires and the signal wires. These can then be electrically coupled to the die chip, for example a light detector die chip, to provide both a signal path and a return ground path.

Another end of the flex cable may also be provided with a conductive plate, such as a metal stiffener, electrically bonded to the ground wires/ground layer of the flex cable. This conductive plate can then be attached to a ground potential, in a manner that will be subsequently described.

In use, the flex cable may be arranged to extend down the front of the carrier (i.e., on the side the die chip is disposed), and then flexed and bent to pass between the feet of the carrier and through the space therebetween. Thus, the conductive plate will then be disposed in a region behind the carrier.

The retainer assembly further includes the retainer, into which the carrier assembly is disposed. The retainer has a housing formed from an insulating material, such as a polymer, for example. The housing has a through hole extending therethrough. The carrier assembly is placed into a rear end of the through hole and arranged so that the coupler is disposed almost entirely within the through hole, with the carrier being disposed outside of the through hole. Once in position, the carrier assembly can be fixed to the housing, for example, by adhering the coupler to the walls defining the through hole. The adhering can be accomplished using a UV structural epoxy, or a thermal initiated epoxy, for example, which would provide the resulting structure with a desired rigidity.

The retainer may also be provided with latching fingers disposed at a front end of the through hole. The latching fingers are adapted to engage with an industry-standard fiber optic connector, which is plugable into the retainer via the front end of the through hole.

The housing and fingers are preferably molded to have a one-piece configuration. This reduces assembly time by eliminating the need to fix separate latching fingers to the housing, and reduces inventory by eliminating multiple parts.

In a further exemplary aspect of the invention, the front end of the retainer may also be provided with an electromagnetic interference shield. The electromagnetic interference shield is preferably formed from a conductive, non-corrosive material, such as steel having a tin plating. However, the electromagnetic interference shield can be formed of any material that will attenuate electromagnetic interference.

The electromagnetic interference shield is hollow, to allow the shield to be slipped over the front end of the retainer. When properly positioned, the edge of the electromagnetic interference shield will be positioned essentially flush with the front end of the retainer. The shield may be provided with inwardly projecting fingers that engage with the surface of the retainer, to hold the shield in place.

The electromagnetic interference shield may be provided with a number of conductive grounding springs, which are disposed around the outer periphery of an end of the shield. The grounding springs may engage with a tailstock, for example, to conductively couple the electromagnetic interference shield to a ground potential. When properly positioned, the grounding springs hold the electromagnetic interference shield in a fixed position relative to the tailstock.

The shield can be used to hold the first and second housings together, when two housings are provided. That is, the shield can be slid around the adjacent housings, and serve as a clamp to retain the housings in their relative positions.

The optical transceiver arrangement may further include a laminate assembly. The laminate assembly includes a printed circuit board or wiring board, that has a plurality of superposed, alternating conductive layers and insulating layers formed in discrete planes. A front surface of the wiring board may have various electronic components, such as a light emitter driver chip and/or light detector driver chip, attached thereto, and may have electrically conductive pathways or wirings (also known as traces) between the components. The driver chips may be positioned so that in the final optical transceiver arrangement, the driver chips are positioned away from the carrier to aid in heat dissipation.

The printed circuit board can be adapted to allow it to be attached to a further printed circuit board, for example, by an end user. By way of example, the lower surface of the printed circuit board can be provided with a plurality of conductive pads arranged in an array, each of which is coupled to a ground plane, power plane and wiring plane of the board, using vias, for example, and each of which may be attached to a respective lead of a further printed circuit board using ball grid array (BGA) technology.

The laminate assembly may further include a polymer coating disposed on the upper surface of the printed circuit board, and upon which the retainer assembly can be disposed. The polymer coating may be relatively thick, and formed to provide locating features to facilitate the positioning of the various other subassemblies. For example, the housing of the retainer assembly may be provided with one or more projecting pins on a lower surface thereof, and the polymer coating may be provided with receiving holes that accommodate the respective projecting pins. Thus, during manufacturing, the retainer assembly can be quickly located on the laminate assembly in the desired location. Moreover, the coating protects the wirings and components on the surface of the circuit board, and helps to distribute heat generated by the drivers over a larger surface area.

Moreover, the polymer coating may be provided with one or more recesses formed therein, to expose respective conductive pads that are electrically coupled to the ground plane. The feet of the carrier can then be electrically bonded, using an electrical epoxy for example, to the conductive pads so that the carrier is electrically coupled to the ground plane. Moreover, the conductive plate of the flex cable may be electrically bonded to another conductive pad, to provide another means of electrically coupling the ground plane to the die chip and carrier. Further, the signal wires of the flex cable may be coupled, for example wire bonded, to respective signal traces on the surface of the laminate. Thereafter, the various electrical connections can be coated to protect the connections and wires from being damaged. For example, the coating can be a so-called chip coat epoxy material.

During the coupling of the flex cable to the laminate assembly, the retainer assembly housing may also be fixed to the laminate assembly. For example, the housing or housings may be epoxied to the laminate assembly.

In another exemplary aspect of the invention, the optical transceiver arrangement may include a cover member including a heat sink disposed over the laminate assembly. In this exemplary aspect of the invention, the polymer coating may include a step arranged around an outer periphery thereof, and the heat sink cover may have a flange that engages with the step to position the heat sink cover relative to the laminate assembly. Once in position, the heat sink cover can transfer and dissipate heat generated by the drivers, for example.

The heat sink cover may also be provided with a downwardly-projecting finger that is adapted to engage with an exposed conductive pad of the printed circuit board, which is coupled with the ground plane. In this manner, when the heat sink cover is in position, the heat sink cover will be electrically coupled with a ground potential, allowing the heat sink cover to serve as a further ground potential for the light emitter/light detector. Moreover, the downwardly-projecting finger can be positioned to extend between the adjacent housings, and in particular between the respective light emitter and light detector when so provided, to serve as an electromagnetic emissions separator. Thus, the heat sink cover can help prevent electromagnetic interference from occurring between the light emitter and light detector.

When properly positioned, the heat sink cover may be bonded in place, for example using an epoxy, and may be positioned to abut against a back of the retainer assembly.

DETAILED DESCRIPTION OF THE PREFERRED EMBODIMENTS

The invention will now be described in more detail by way of example with reference to the embodiments shown in the accompanying figures. It should be kept in mind that the following described embodiments are only presented by way of example and should not be construed as limiting the inventive concept to any particular physical configuration.

Further, in the application, the terms "upper", "lower", "front", "back", "over", "under", and similar such terms are not to be construed as limiting the invention to a particular orientation. Instead, these terms are used only on a relative basis.

Figure 1:
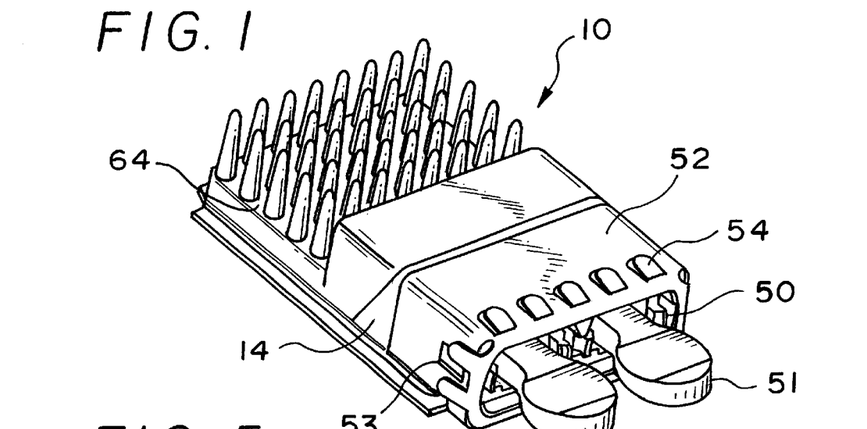
FIG. 1 is a perspective view of an optical transceiver arrangement, according to an exemplary aspect of the invention.

Referring to FIG. 1, the present invention is directed toward an optical transceiver arrangement 10. In an exemplary aspect of the invention, the optical transceiver arrangement 10 is formed from a plurality of interconnected subassemblies, the details of which will be described in the paragraphs that follow.

Figure 2:
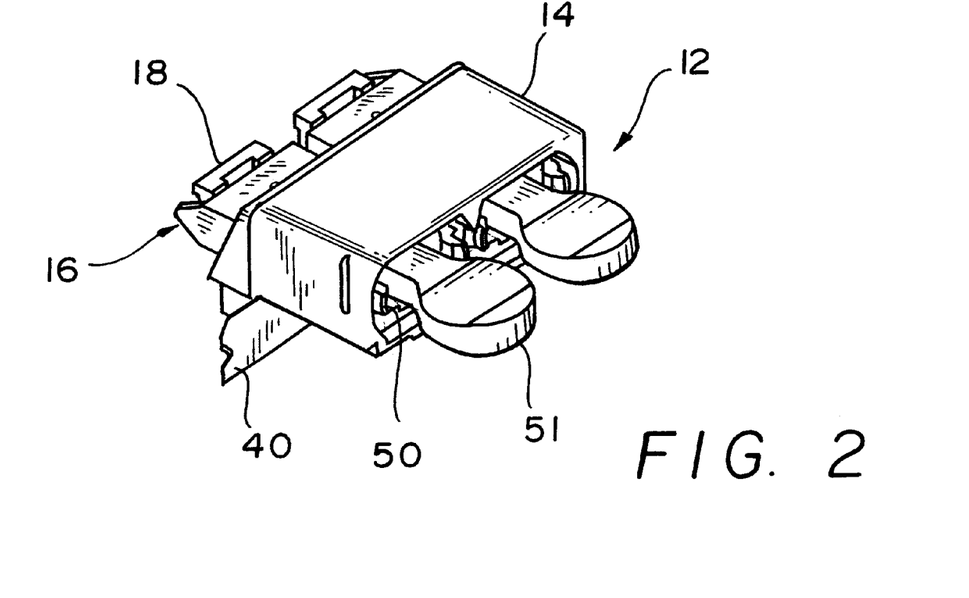
FIG. 2 is a perspective view of a retainer subassembly of the optical transceiver arrangement shown in FIG. 1.
Figure 3:
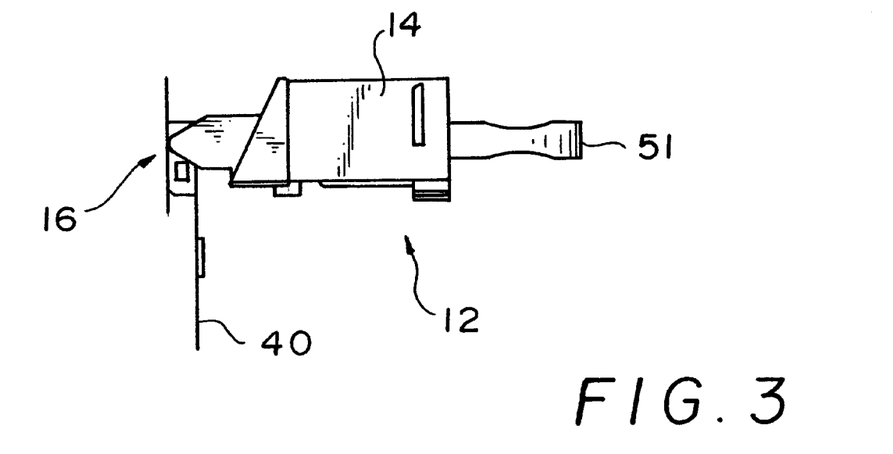
FIG. 3 is a side view of the retainer assembly shown in FIG. 2.
Figure 4:
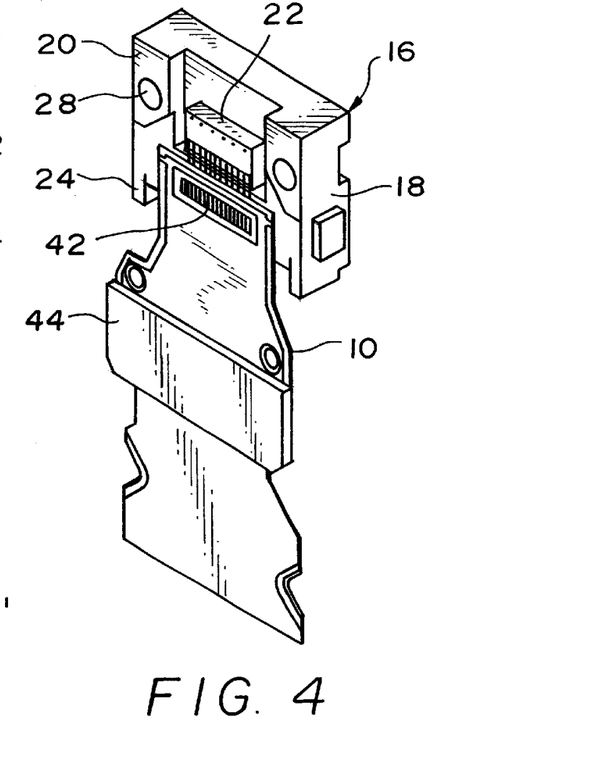
FIG. 4 is a perspective view of a carrier subassembly of the retainer subassembly shown in FIG. 2.
Figure 5:
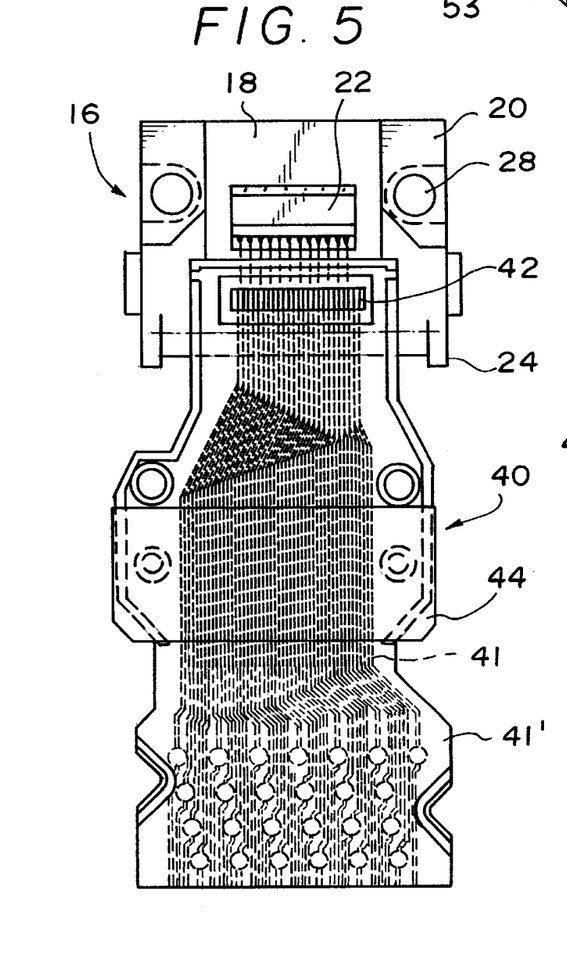
FIG. 5 is an elevational view of the carrier subassembly shown in FIG. 4.

As shown in FIGS. 2 and 3, one of the subassemblies of the optical transceiver arrangement 10 is a retainer assembly 12, which includes a retainer 14 and a carrier assembly 16. As best shown in FIGS. 4 and 5, the carrier assembly 16 includes a die carrier 18, having opposing lands 20. In the exemplary illustrated embodiment, the opposing lands 20 have a receiving space therebetween, in which either a light emitter die chip or a light detector die chip (hereinafter referred to collectively as a die chip 22) is disposed.

The carrier 18 may be manufactured from a conductive material, so that it can serve as a ground for the die chip 22. For example, the carrier 18 can be formed from copper, and be gold plated to enhance its conductivity and reduce its susceptibility to oxidation. However, it is contemplated that the carrier 18 can be manufactured from other materials without departing from the spirit and scope of the invention.

In another exemplary aspect of the invention, the carrier 18 has spaced apart feet 24, which can be attached to a further subassembly of the optical transceiver arrangement 10, which will be subsequently described. The feet 24 provide a space under the carrier 18 in which other components can be disposed. Moreover, the feet 24 are shown as being in registration with the lands 20. However, variations in the relative placement of the feet 24 and lands 20 are within the scope of the invention.

Figure 6:
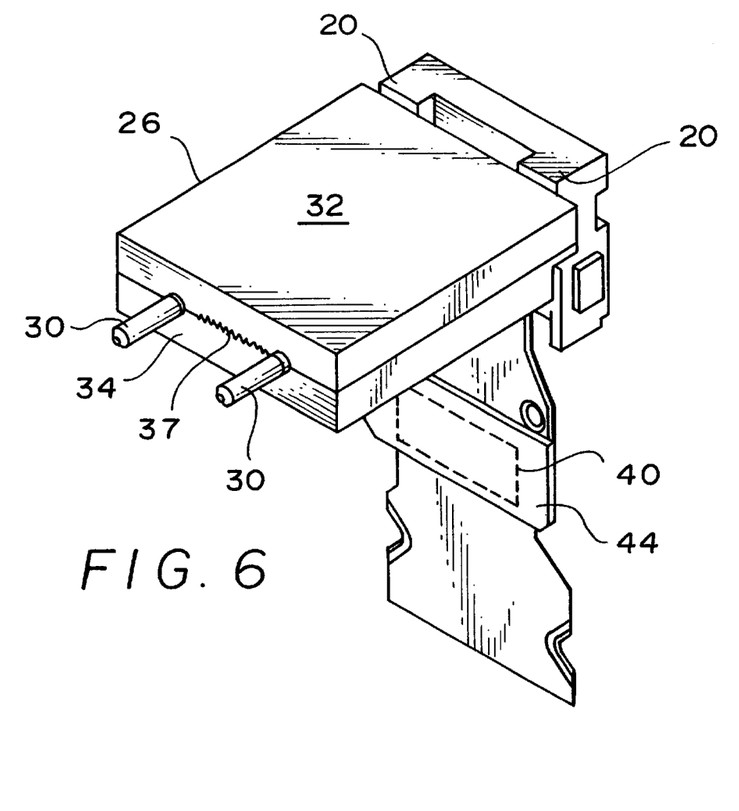
FIG. 6 is a perspective view of the carrier subassembly shown in FIG. 4, having an optical coupler attached.

Referring also to FIG. 6, each land 20 is adapted to allow an optical coupler 26 to be attached thereto. Further, the lands 20 are adapted to project out beyond the die chip 22, to prevent the coupler 26 from having direct contact with the active regions (i.e., the regions that emit or detect the light) of the die chip 22. The optical coupler 26 is adapted to optically couple the active regions of the light emitter or light detector with a fiber connector (i.e., an industry standard connector attached to an end of an optical fiber ribbon, not shown), so that optical signals can be accurately transmitted therebetween. For example, each land 20 can be provided with a receiving or alignment hole 28 (FIGS. 4 and 5), which receives a corresponding alignment pin 30 of the optical coupler 26 in a clearance fit. The alignment pins received within the alignment holes are not shown (due to their receipt within the respective holes) but are similarly tailored to the alignment pins 30 projecting out of the opposite side of the coupler.

Figure 7:
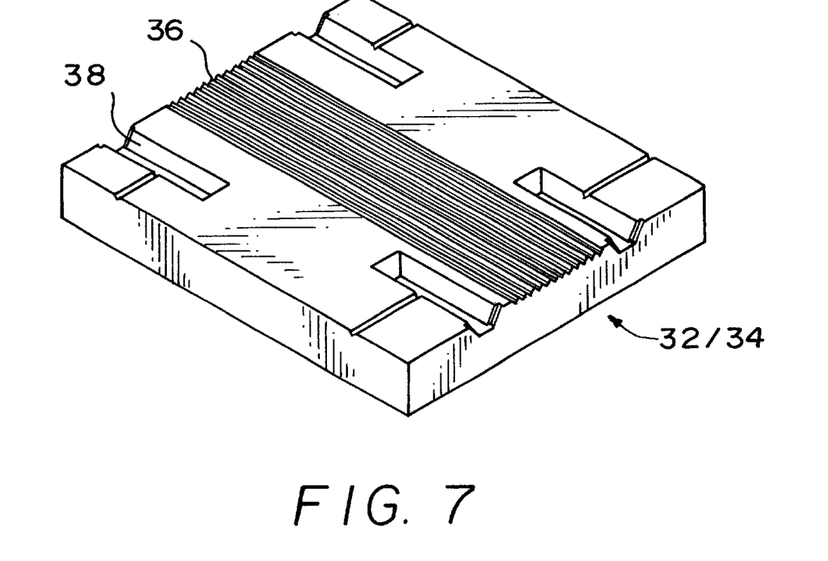
FIG. 7 is a perspective view of a plate of the optical coupler shown in FIG. 6.
Figure 8:
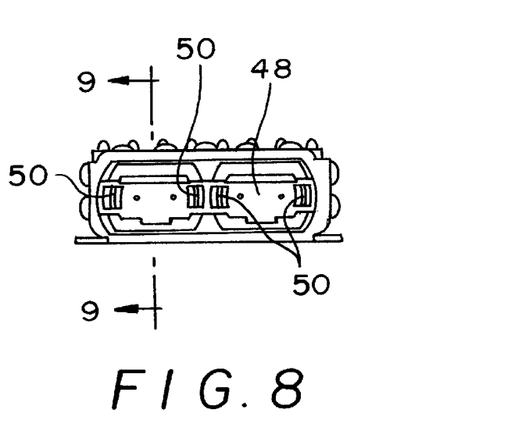
FIG. 8 is a front elevational view of the optical transceiver arrangement shown in FIG. 1, but without the plugs in the openings.
Figure 9:
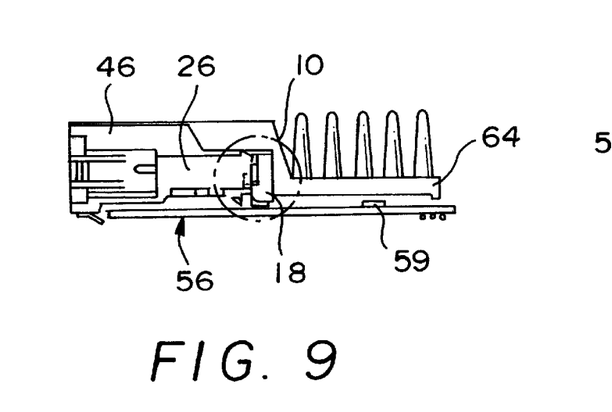
FIG. 9 is a sectional view of the optical transceiver arrangement, taken along section lines 9—9 in FIG. 8.
Figure 10:
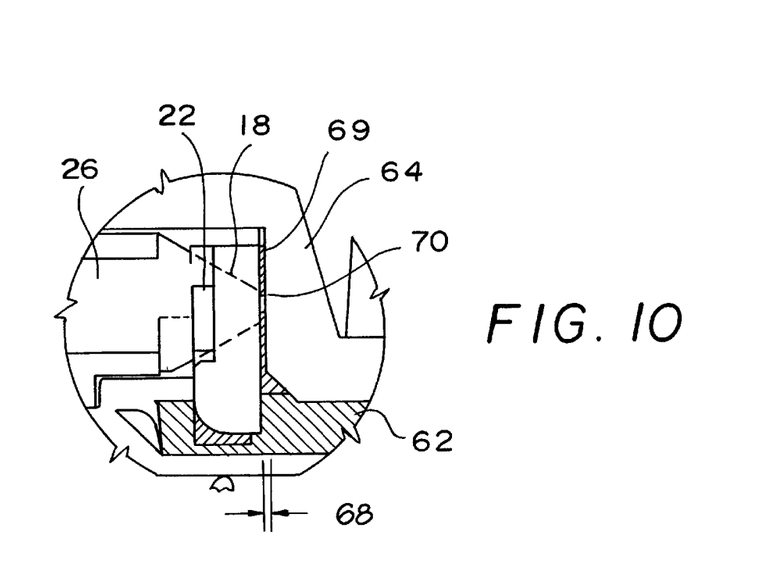
FIG. 10 is an enlarged view of a portion of the sectional view shown in FIG. 9.
Figure 11:
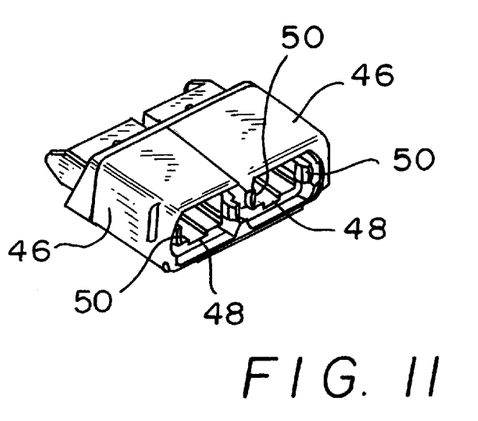
FIG. 11 is a perspective view of a retainer of the retainer subassembly shown in FIG. 2.

Referring also to FIGS. 6 and 7, the optical coupler 26 can be manufactured in accordance with the disclosure contained within U.S. patent application Ser. No. 09/894,714, attorney docket no. ROC920010151US1-IBM-210, filed concurrently herewith, entitled Enhanced Optical Coupler, and assigned to International Business Machines, Corporation. Briefly, such an optical coupler 26 may include at least two plates 32/34 disposed in a superposed relationship. At least one of the plates, or alternatively both of the plates, has a plurality of spaced apart narrow grooves 36 formed in a surface thereof, each of which extends from one end face to another end face of the respective plates. Each of the narrow grooves 36 has an optical fiber 37 disposed therein (only the end face of which being shown in FIG. 6). Further, the plate or plates have a plurality of wide grooves 38 formed in the surface. Each wide groove 38 extends from a respective end face, and may terminate at an intermediate portion of the plate or plates. Each of the wide grooves has an alignment pin 30 disposed therein. When the plates are joined together in the superposed relationship, the narrow grooves 36 form through holes for the respective optical fibers, and the wide grooves 38 form blind holes for the alignment pins. Alternatively, the wide grooves can extend from end face to end face of the plates, so that instead of blind holes, wide through holes are formed. When formed, each of the optical fibers 37 of the optical coupler 26 are alignable with respective ones of the active regions of the die chip 22, respective ones of the alignment pins 30 are insertable into the receiving holes 28 in the lands 20 of the carrier 18, and respective other ones of the alignment pins 30 are engagable with the fiber optic connector (not shown).

The optical fibers 37 of the optical coupler 26 may be actively aligned with the active regions, so as to ensure that the emitted light does not partially or completely "miss" its intended target. By way of example, with the alignment pins 30 received with a clearance fit in the respective receiving holes 28, and with a 12 channel light emitter (i.e., a light emitter having 12 active regions), the light emitter may be turned on (activated). The first optical fiber of the optical coupler 26 could then be aligned, in both a x- and a y-direction, with the center of the first channel. The optical coupler 26 could then be rotated about the z-axis of the first channel, until the maximum output of the twelfth channel is ascertained. Thereafter, a UV curable adhesive, for example, could be used to fix the respective alignment pins in the respective receiving holes in the lands, thereby locking the optical coupler in alignment with the active regions of the die chip.

After alignment, an epoxy, for example, can be used to seal the exterior edges of the optical coupler 26 to the surface of the die chip 22. The epoxy may have a sufficiently high viscosity so as to prevent the epoxy from flowing into the gap between the front edge of the optical coupler 26 and the active regions of the die chip 22. Thus, a sealed air gap will be formed between the ends of the optical fibers 37 in the coupler 26 and the active regions to allow for the efficient transmission of light, while preventing contaminants from entering this space.

In a further exemplary aspect of the invention, the carrier assembly 16 includes a flex cable 40 that is electrically coupled to the die chip 22. In the exemplary illustrated embodiment, the flex cable 40 has a ground layer (hereinafter referred to as ground wires) and signal wires (shown in hidden lines, and referenced as 41 in FIG. 5) which may be covered by an insulating coating 41', such as plastic. The insulating coating 41' may be removed in a region at one end of the flex cable 40, to form one or more "windows" 42 which expose the signal wires, grounds wires, or both as they pass through the space of the windows. For example, if the flex cable 40 is provided with two windows 42, one disposed over the other (not shown), the lower window can be adapted to expose the ground wires, so that the exposed ground wires may be electrically coupled to the conductive carrier 18. The upper window can then be adapted to expose the signal wires, which can then be electrically coupled to the die chip 22. This arrangement works well when the die chip is attached and directly grounded to the carrier 18. For example, the back of the light emitter die chip 22 may be bonded to the carrier 18 using an electrically-conductive epoxy, so that the light emitter die chip is grounded directly to the conductive carrier. Alternatively, if the die chip 22 is not directly grounded to the carrier 18, then the flex cable 40 can be provided with only one window, which is adapted to expose both the ground wires and the signal wires. These can then be electrically coupled to the die chip 22, for example a light detector die chip, to provide both a signal path and a return ground path.

By way of example, the signal wires and the ground wires of the flex cable 40 may be electrically coupled to the carrier 18 and/or die chip 22 using a so-called tab bonding technique. Such a technique is well known to those skilled in the art, and includes using pressure, heat and vibrations to ultrasonically weld the components together. Moreover, a wire-bond conductive ball (not shown) may be used to couple the signal wires to the die chip. For example, the wire-bond ball may be connected to tab bonds of the die chip. The wire-bond ball may be coined down (i.e., flattened), to provide a smooth, flat surface to which the signal wires may be bonded. By bonding the signal wires to the wire-bond balls, as opposed to a surface of the die chip, the surface of the die chip is protected against damage that may otherwise occur during the tab bonding technique. The tab bonds may then be covered with a chip-coat protective adhesive, for example, to protect the connection.

Another end of the flex cable 40 may be provided with a conductive plate 44, such as a metal stiffener plate, electrically bonded to the ground wires/ground plane of the flex cable. This conductive plate 44 can then be easily attached to a ground potential, in a manner that will be subsequently described.

In use, the flex cable 40 may be arranged to extend down the front of the carrier 18 (i.e., on the side the die chip 22 is disposed), and then flexed and bent to pass between the feet 24 of the carrier and through the space therebetween. Thus, when in use, the conductive plate 44 will be disposed in a region behind the carrier 18.

As best shown in FIGS. 2, 3 and 8–12, the retainer 14 is adapted to receive the carrier assembly 16. In the illustrated exemplary aspect of the invention, the retainer 14 includes first and second connector housings 46 disposed side-by-side, each of which is adapted to accommodate a respective carrier assembly 16 at one end thereof. This configuration allows both a light emitter and a light detector, for example, to be disposed in the same assembly, therefore saving circuit board space. The respective housings 46 can be manufactured separately and joined together, for example, or the two housings can be integrally molded together. In the illustrated exemplary embodiment, the retainer 14 includes a pair of housings 46 formed, for example, from an insulating material, such as a polymer. Each of the housings 46 has a through hole 48 extending therethrough. A respective carrier assembly 16 is placed at a rear end of each of the through holes 48 and arranged so that the coupler 26 is disposed almost entirely within the through hole, with the carrier 18 being disposed outside of the through hole. Once in position, the carrier assembly 16 can be fixed to the retainer 14, for example, by adhering the coupler 26 to the walls defining the through holes. The adhering can be accomplished using a UV structural epoxy, for example, or a thermal initiated epoxy, for example, which would provide the resulting structure with a desired rigidity.

The retainer 14 may also be provided with a pair of latching fingers 50 disposed at a front end of each of the through holes 48. The latching fingers 50 are adapted to engage with an industry-standard fiber optic connector (not shown), such as a MPO/MTP connector which is plugable into the retainer 14 via the front end of the through hole 48. Moreover, and as shown in FIG. 1, when not attached to the fiber optic connector, plugs 51 can be inserted in the respective through holes 48 and retained therein by the fingers 50. These plugs 51 prevent contaminants from entering the through holes, when the optical transceiver arrangement 10 is not in use.

The housing 46 and fingers 50 are preferably molded to have a one-piece configuration. This reduces assembly time by eliminating the need to fix separate latching fingers to the housing, and reduces inventory by eliminating multiple parts.

Figure 13:
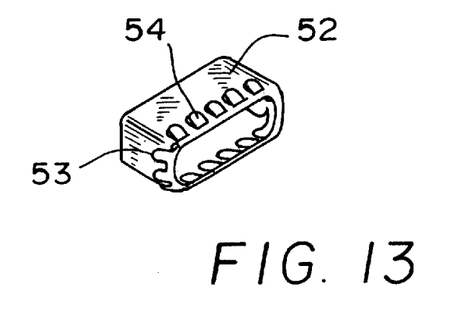
FIG. 13 is a perspective view of an EMI shield of the optical transceiver arrangement shown in FIG. 1.
Figure 14:
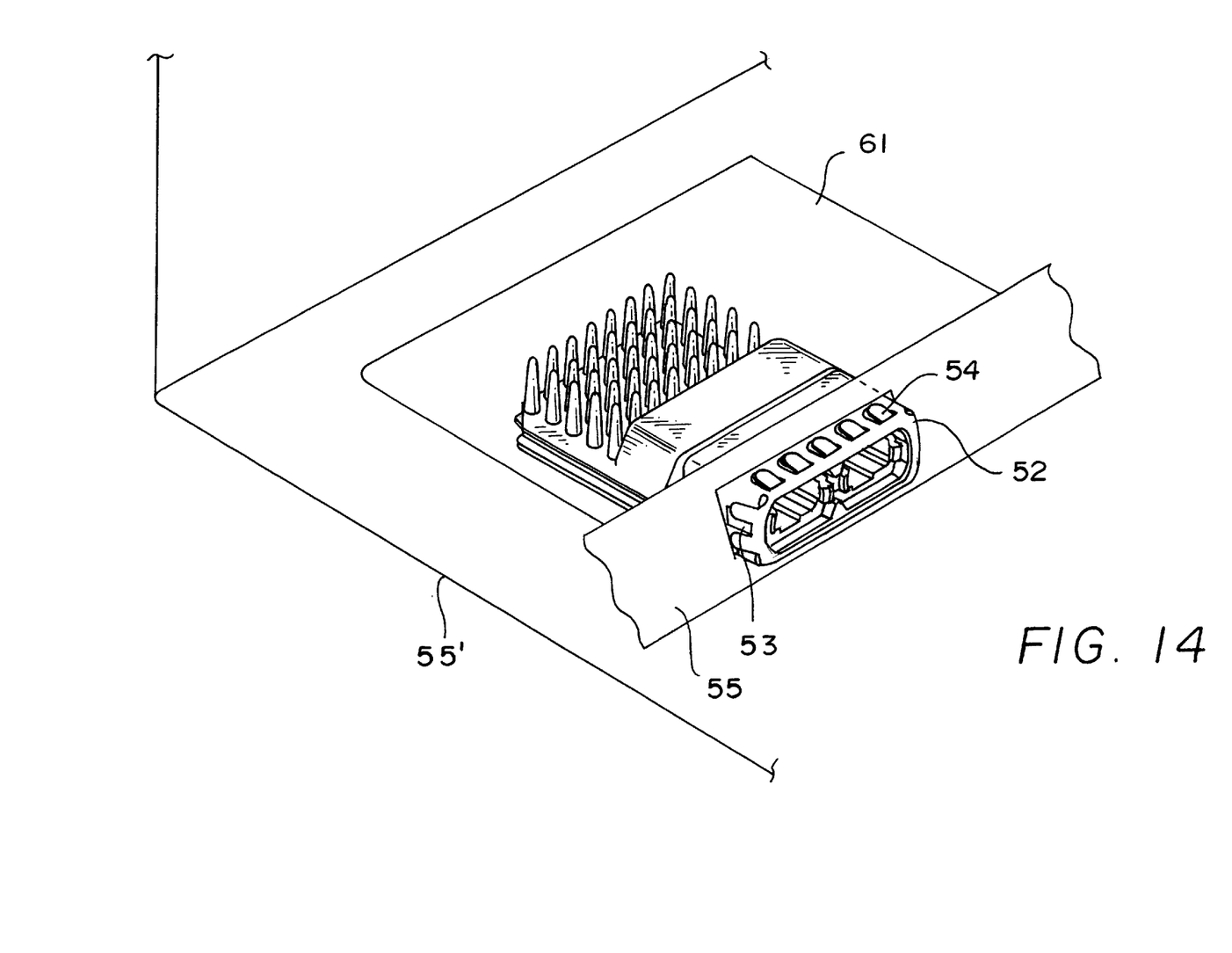
FIG. 14 is a perspective view of the optical transceiver arrangement shown in FIG. 1 within a computer.

Referring also to FIGS. 13 and 14, the front end of the retainer 14 may also be provided with an electromagnetic interference shield 52. The electromagnetic interference shield 52 is preferably formed from a conductive, non-corrosive material, such as steel having a tin plating. However, the electromagnetic interference shield 52 can be formed of any material that will attenuate electromagnetic interference.

As shown, the electromagnetic interference shield 52 is hollow, to allow the shield to be slipped over the front end of the retainer 14. When properly positioned, the edge of the electromagnetic interference shield 52 will be positioned essentially flush with the front end of the retainer 14. The shield 52 may be provided with inwardly projecting fingers 53 that engage with the surface of the retainer 14, to hold the shield in place.

Preferably, the electromagnetic interference shield 52 is provided with a number of conductive grounding springs 54, which are disposed around the outer periphery of an end of the shield. The grounding springs 54 engage, for example, with a tailstock 55 attached to a system frame 55' of a computer, for example, to conductively couple the electromagnetic interference shield to a ground potential. When properly positioned, the grounding springs 54 hold the electromagnetic interference shield 52 in a fixed position relative to the tailstock 55.

By way of example, the grounding springs 54 can be formed as metal fingers which extend in the same plane, and contiguous with, a respective wall of the shield 52. The metal fingers can then be bent so that the fingers are disposed essentially superposed to the respective walls they are attached to. However, due to the memory effect of the material, the fingers will exert a spring force that acts in a direction away from the walls. Thus, the metal fingers can engage with the tailstock, in the aforementioned manner.

In the illustrated exemplary embodiment, the shield 52 can be used to hold the first and second housings 46 together, when two separate housings are provided. That is, the shield 52 can be slid around the adjacent housings 46, and serve as a clamp to retain the housings in their relative positions.

Referring also to FIGS. 15–18, in a further exemplary aspect of the invention, the optical transceiver arrangement 10 further includes a laminate assembly 56. The laminate assembly 56 comprises a printed circuit board or wiring board 58, that includes a plurality of superposed, alternating conductive layers and insulating layers formed in discrete planes. Although the individual layers are not separately shown, such arrangements are known to those skilled in the art. In the exemplary illustrated embodiment, the wiring board 58 is a relatively flat board having a front surface that has various electronic components 59, such as a light emitter driver chip and/or light detector driver chip attached thereto, and having electrically conductive pathways or wirings (also known as traces) between the respective components. Preferably, the driver chips are positioned so that in the completed optical transceiver arrangement, the driver chips are positioned away from the carrier 18 to aid in heat dissipation.

By way of example, the conductive layers may include one or more internal wiring planes (i.e., a set of wirings located in one plane), each of which includes a number of individual conductive wirings. As mentioned above, the wirings are used to interconnect the various electronic components locatable on the printed circuit board together, and allow for the transmission of electrical signals.

Further, the conductive layers of the board may also include one or more power planes and/or ground planes, which are typically sheets of conductive material, such as copper. The power plane is used to supply power from the printed circuit board 58 to the various electronic components 59 located on the printed circuit board, whereas the ground plane serves as a ground potential for the various electronic components. The power plane and the ground plane may be located in different planes from the wiring plane, or may be located in the same plane as a respective wiring plane.

Figure 17:
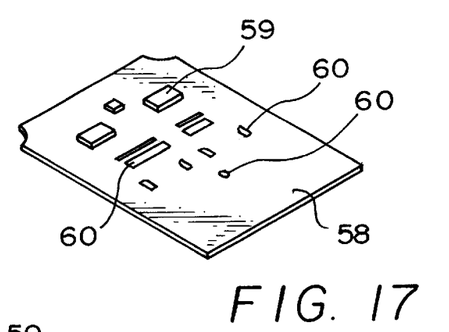
FIGS. 17 and 18 are various views of the wiring board of the laminate subassembly shown in FIGS. 15 and 16.
Figure 18:
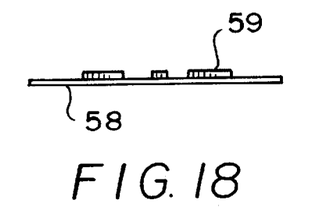

Each of the conductive layers of the printed circuit board 58 may be separated from the other overlying and/or underlying conductive layers by a respective layer of insulating material. Moreover, the printed circuit board 58 may be provided with a number of plated mechanically-formed through holes and/or a number of plated mechanically-formed vias (i.e., blind holes formed in the insulating layers and plated or filled with a conductive material). Each plated via and plated through hole is electrically coupled to a respective conductive layer, and is used to transmit power or electrical signals, through respective insulating layers, to and from the associated electronic components and/or between the respective conductive layers. Further, the vias, for example, can be used to interconnect the ground plane and wiring plane to respective conductive pads 60 formed on surfaces of the wiring board.

The printed circuit board 58 can be adapted to allow its attachment to a further printed circuit board 61 (see FIG. 14), such as a backplane, for example, by an end user. By way of example, the lower surface of the printed circuit board 58 can be provided with a plurality of conductive pads arranged in an array (not shown), each of which is coupled to the ground plane, power plane and/or wiring plane, using the vias, for example, and each of which may be attached to a respective lead of the printed circuit board 61 using ball grid array (BGA) technology. Although not shown, such technology is well known to those skilled in the art.

Figure 15:
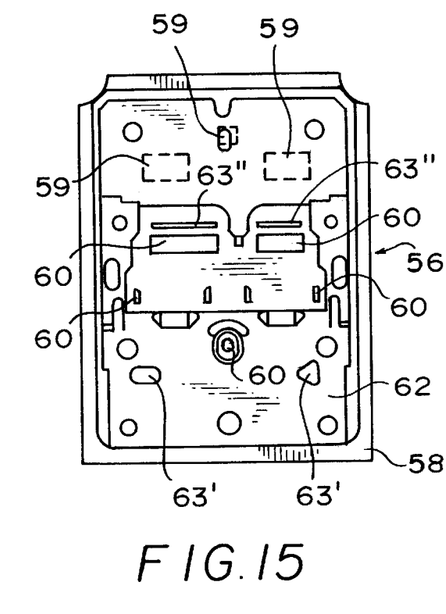
FIGS. 15 and 16 are various views of a laminate subassembly of the optical transceiver arrangement shown in FIG. 1.
Figure 16:
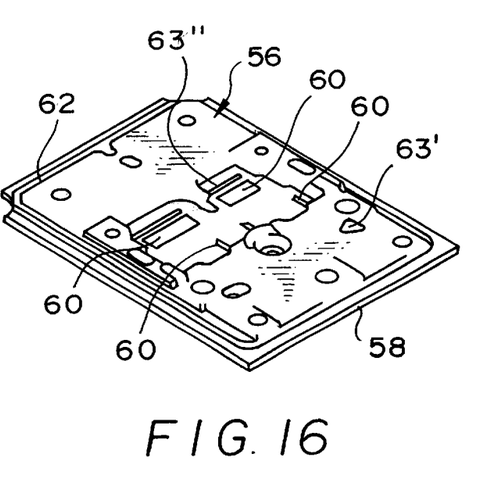

The laminate assembly 56 may also include a polymer, for example, coating 62 disposed on the upper surface of the printed circuit board 58, and upon which the retainer assembly 12 can be disposed. The polymer coating 62 may be relatively thick and formed to provide locating features 63 to facilitate the positioning of the various other subassemblies. For example, the housings 46 may be provided with one or more projecting pins 63 on lower surfaces thereof (see FIG. 12), and the polymer coating 62 may be provided with receiving holes 63' that accommodate the respective projecting pins. Thus, the retainer assembly 12 can be quickly located on the laminate assembly 56 in a desired position. Moreover, the coating 62 protects the wirings and components on the surface of the circuit board 58, and helps to distribute heat generated by the drivers 59 over a larger surface area.

Moreover, the polymer coating 62 may be provided with one or more recesses formed therein. In the illustrated exemplary embodiment, a relatively large recess may be formed in a central region of the coating 62, to expose signal and/or power traces 63" that are coupled to the wiring plane and/or power plane, and to expose one or more conductive pads 60 that are electrically coupled to the ground plane. The feet 24 of the carrier 18 can then be electrically bonded, using an electrical epoxy for example, to the exposed conductive pads 60 electrically coupled to the ground plane, so that the carrier is likewise electrically coupled to the ground plane. Moreover, the conductive plate 44 of the flex cable 40 may be electrically bonded to another conductive pad 60, to provide another means of electrically coupling the ground plane to die chip 22 and carrier 18. Further, the signal wires of the flex cable 40 may be coupled, for example wire bonded, to the respective signal and/or power traces 63" on the surface of the wiring board 58. Thereafter, the various electrical connections can be coated to protect the connections and wires from being damaged. For example, the coating can be a so-called chip coat epoxy material.

During the coupling of the flex cable 40 to the wiring board 58, the housings 46 may also be fixed to the laminate assembly 56. For example, the housing or housings may be epoxied to the laminate assembly.

Figure 19:
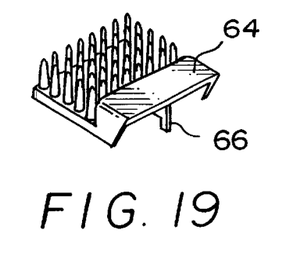
FIG. 19 is a perspective view of a heat sink cover of the optical transceiver arrangement shown in FIG. 1.

The optical transceiver arrangement 10 may also include a cover member 64 that serves as a heat sink is disposed over the laminate assembly 56. In this exemplary aspect of the invention, the polymer coating 62 includes a step arranged around an outer periphery thereof, and the heat sink cover 64 has a flange that engages with the step to position the heat sink cover relative to the laminate assembly. Once in position, the heat sink cover 64 can transfer and dissipate heat generated by the drivers 59, for example.

Figure 12:
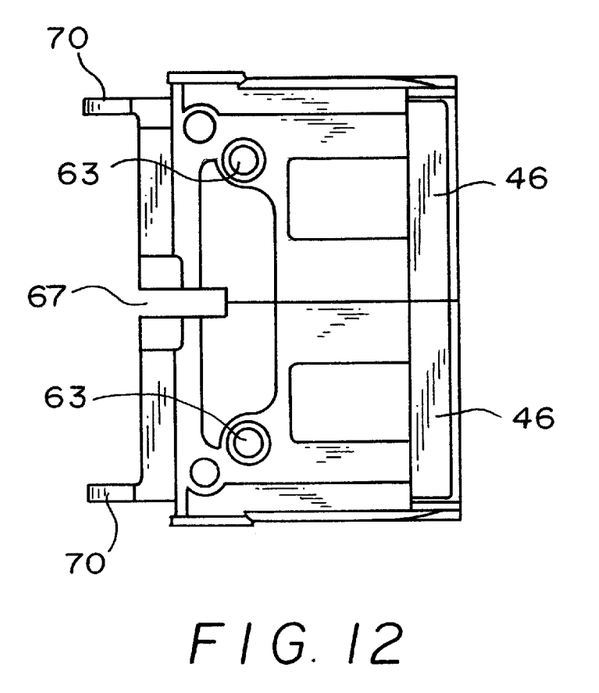
FIG. 12 is a bottom view of the retainer shown in FIG. 11.

The heat sink cover 64 may also be formed from an electrically conductive material and be provided with a downwardly-projecting finger 66 that is adapted to engage with an exposed conductive pad 60 of the printed circuit board, which is coupled with the ground plane. In this manner, when the heat sink cover 64 is in position, the heat sink cover will be electrically coupled with a ground potential, allowing the heat sink cover to serve as a further ground potential for the light emitter/light detector. Moreover, the downwardly-projecting finger 66 can be positioned to extend between the first and second housings 46, and in particular between the respective light emitter and light detector when so provided, to serve as an electromagnetic emissions separator. For example, the finger 66 can extend through the gap 67, as shown in FIG. 12. Thus, the heat sink cover 64 can help to prevent electromagnetic interference from occurring between the light emitter and the light detector.

Once properly positioned, and referring back to FIG. 10, the heat sink cover 64 is bonded in place, for example using an epoxy, and will preferably be positioned to abut against a back of the retainer assembly 12. Moreover, in an exemplary aspect of the invention, a gap 68 is preferably present between the back of the carrier 18 and the heat sink cover 64, which is subsequently filled with a thermal epoxy 69. The thermal epoxy provides for improved conductivity between the carrier and the heat sink cover. This gap 68, which may be 0.005 inches, for example, can be established using ears 70 (see FIG. 12) which project from a rear of the respective housings 46. The ears 70 abut against the heat sink cover 64 when the heat sink, carrier, housings and laminate assembly are all properly joined together.

The present invention results in an optical transceiver arrangement in which various delicate components are sealed and protected. Moreover, the thermal characteristics are optimized, resulting in increased efficiency. Further, optical clarity is enhanced and the resulting structure can be easily assembled and used in small spaces. Further, the arrangement allows for both a transmitter and detector in the same package. Additionally, this arrangement allows NPO and MTP optical connectors to be selectively attached thereto.

It should be understood, however, that the invention is not necessarily limited to the specific arrangement and components shown and described above, but may be susceptible to numerous variations within the scope of the invention.

It will be apparent to one skilled in the art that the manner of making and using the claimed invention has been adequately disclosed in the above-written description of the preferred embodiments taken together with the drawings.

It will be understood that the above description of the preferred embodiments of the present invention are susceptible to various modifications, changes, and adaptations, and the same are intended to be comprehended within the meaning and range of equivalents of the appended claims.

What is claimed is:

1. An optical arrangement, comprising:
    a retainer assembly, including:
        first and second housings, each being adapted to be coupled to a fiber optic cable; and
        carrier assemblies, each having a carrier, and each being connected to said a respective housing, and each having a die chip attached to a respective carrier, said die chips each having at least one active region;
    optical couplers disposed in said housings and adapted to be optically coupled to the fiber optic cable;
    a laminate assembly having said retainer assembly disposed thereon, said die chips being electrically coupled to said laminate assembly; and
    a heat sink disposed over said laminate assembly and having an extending portion that extends to cover at least a portion of said housings, so that the extending portion is disposed over said optical couplers, said heat sink being connected to said carriers, said heat sink having a downwardly-projecting finger that extends downward from the extending portion and between said first housing and said second housing and engages with said laminate assembly to provide for electromagnetic separation between said housings.

2. The optical arrangement recited in claim 1, wherein said retainer assembly further includes flex cables electrically coupling said die chips to said laminate assembly.

3. The optical arrangement recited in claim 2, wherein said laminate assembly includes a printed circuit board having a ground plane and conductive pads disposed on a surface of said printed circuit board, said conductive pads being electrically coupled to said ground plane, said flex cables being electrically coupled to said conductive pads.

4. The optical arrangement recited in claim 3, wherein said laminate assembly includes a coating covering the surface of said printed circuit board, said coating having recesses formed therein that exposes said conductive pads to allow said flex cables to be electrically coupled to said conductive pads.

5. The optical arrangement recited in claim 4, wherein each said flex cable has a conductive plate in electrical contact with a respective conductive pad, and each having ground wires electrically coupled to at least one of said respective die chip and said respective carrier, said ground wires further being electrically coupled to said conductive plates.

6. The optical arrangement recited in claim 5, wherein said flex cables further have signal wires extending therethrough, and an insulating coating covering said signal wires and said ground wires, said insulating coating having at least one window formed therein to expose said signal wires and said ground wires, to allow said signal wires to be electrically coupled to said die chips, and to allow the ground wires to be electrically coupled to said at least one of said respective die chip and said respective carrier.

7. The optical arrangement recited in claim 2, wherein each said carrier has first and second spaced apart feet, said flex cables extending between said spaced apart feet.

8. The optical arrangement recited in claim 2, wherein said laminate assembly includes a printed circuit board having a ground plane and conductive pads disposed on a surface of said printed circuit board, said conductive pads being electrically coupled to said ground plane; and wherein each said carrier has a foot electrically coupled to a respective conductive pad.

9. The optical arrangement recited in claim 1, wherein said laminate assembly includes a printed circuit board and a coating covering the surface of said printed circuit board, said coating having locating holes formed therein; and wherein each said housing has a locating pin extending from a bottom thereof, said locating pins being received within a respective locating hole to position said housings relative to said laminate assembly.

10. The optical arrangement recited in claim 1, wherein each said housing has a through hole extending therethrough, said optical couplers being positionable within the respective through holes for optically coupling said active regions to the fiber optic cable.

11. The optical arrangement recited in claim 10, further comprising an electromagnetic interference shield disposed around said housings.

12. The optical arrangement recited in claim 11, wherein said electromagnetic interference shield retains said housings in direct contact with each other and in a side-by-side relationship.

13. The optical arrangement recited in claim 10, wherein said heat sink transfers heat from said laminate assembly.

14. The optical arrangement recited in claim 13, wherein said laminate assembly includes a printed circuit board having a ground plane and at least one conductive pad disposed on a surface of said printed circuit board, said conductive pad being electrically coupled to said ground plane; and wherein said downwardly-projecting finger engages with said conductive pad to provide for the electromagnetic separation between said housings.

15. The optical arrangement recited in claim 1, wherein each said housing has a through hole extending therethrough, and latching fingers within the through hole and being adapted to engage with the fiber optic cable.

16. The optical arrangement recited in claim 15, wherein said fingers and said respective housing form a one-piece configuration.

17. The optical arrangement recited in claim 1, wherein said heat sink is electrically coupled with said laminate assembly.

18. The optical arrangement recited in claim 1, wherein said laminate assembly includes a printed circuit board, a driver chip disposed on a surface of said printed circuit board, and a coating covering said driver chip.

19. The optical arrangement recited in claim 18, wherein said heat sink is disposed on top of said laminate assembly and over said driver chip.

20. The optical arrangement recited in claim 1, wherein said die chips are separated from said optical couplers by an air gap.

21. The optical arrangement recited in claim 20, wherein exterior edges of said optical couplers are joined to said die chips, to seal the air gap between said die chips and said optical couplers and prevent contaminants from entering the respective air gaps.

22. The optical arrangement recited in claim 21, wherein the exterior edges of said optical couplers are joined to said die chips using a sealant, and wherein the respective air gaps are maintained to be free of the sealant.

23. An optical arrangement, comprising:
   a retainer assembly, including:
      first and second housings, each being adapted to be coupled to a fiber optic cable; and
      carrier assemblies, each having a carrier having two spaced apart lands, each said carrier being connected to a respective housing, and each carrier assembly having a die chip attached to a respective carrier and being disposed between said lands, each of said die chips having a plurality of active regions;
   optical couplers disposed in said housings and adapted to be optically coupled to the fiber optic cable for optically coupling said active regions to the fiber optic cable, said optical couplers being fixed to said lands so as to be positioned in front of said active regions:
   a laminate assembly having said retainer assembly disposed thereon, said die chips being electrically coupled to said laminate assembly; and
   a heat sink disposed over said laminate assembly and connected to said carriers, said heat sink having a downwardly-projecting finger that extends between said first housing and said second housing and engages with said laminate assembly to provide for electromagnetic separation between said housings.

24. The optical arrangement recited in claim 23, wherein each land has an alignment hole formed therein.

25. The optical arrangement recited in claim 24, wherein each said optical coupler includes:
   a first plate having a plurality of first narrow grooves formed in a surface thereof, each narrow groove extending from one end face to another end face of said first plate, and having a plurality of first wide grooves formed in the surface thereof;
   a second plate having a plurality of second narrow grooves formed in a surface thereof, each of said second narrow grooves extending from one end face to another end face of said second plate, and having a plurality of second wide grooves formed in the surface thereof, said second plate being disposed on said first plate so that the respective surfaces are adjoining one another, with the respective first narrow grooves being in alignment with the second narrow grooves to form a plurality of through holes, and the respective first wide grooves being in alignment with the second wide grooves to form a plurality of pin receiving holes;
   a plurality of alignment pins, each being disposed in a respective pin receiving hole, wherein at least some of said alignment pins are positionable within the alignment holes in a clearance fit; and
   a plurality of optical fibers, each being disposed in a respective through hole, each of said optical fibers being alignable with respective ones of said active regions.

26. A computer, comprising:
   a frame;
   a circuit board disposed within said frame; and
   an optical transceiver arrangement coupled to said circuit board, comprising:
      a retainer assembly, including:
         first and second housings, each being adapted to be coupled to a respective fiber optic cable; and
         carrier assemblies, each having a carrier, and each being connected to a respective housing, and each having a die chip attached to a respective carrier, said die chips each having at least one active region;
      optical couplers disposed in said housings and adapted to be optically coupled to the fiber optic cables;
      a laminate assembly having said retainer assembly disposed thereon, said die chips being electrically coupled to said laminate assembly; and
      a heat sink disposed over said laminate assembly and having an extending portion that extends to cover at least a portion of said housings, so that the extending portion is disposed over said optical couplers, said heat sink being connected to said carriers, said heat sink having a downwardly-projecting finger that extends downward from the extending portion and between said first housing and said second housing and engages with said laminate assembly to provide for electromagnetic separation between said housings.

27. The computer recited in claim 26, wherein said retainer assembly further includes a flex cable electrically coupling said die chip to said laminate assembly; and wherein said laminate assembly includes a wiring board having a ground plane and at least one conductive pad disposed on a surface of said wiring board, said conductive pad being electrically coupled to said ground plane, said flex cable being electrically coupled to said conductive pad.

28. The computer recited in claim 27, wherein said laminate assembly includes a coating covering the surface of said wiring board, said coating having at least one recess formed therein that exposes the at least one conductive pad to allow said flex cable to be electrically coupled to said conductive pad.

29. The computer recited in claim 28, wherein said laminate assembly is electrically coupled to said circuit board.

30. The computer recited in claim 27, wherein said laminate assembly includes a coating covering the surface of said wiring board, said coating having a locating hole formed therein; and wherein at least one of said housings has a locating pin extending from a bottom thereof, said locating pin being received within the locating hole to position said housings relative to said laminate assembly.

31. The computer recited in claim 30, wherein said optical transceiver arrangement further includes an electromagnetic interference shield disposed about said housings.

32. The computer recited in claim 26, wherein each said housing has a rearwardly projecting ear in contact with said heat sink and establishing a gap between said carriers and said heat sink.

33. The computer recited in claim 26, wherein each die chip is separated from an associated optical coupler by an air gap, with exterior edges of each optical coupler being respectively joined to each die chip, to seal the air gap between said die chip and said optical coupler and prevent contaminants from entering the air gap, and wherein the exterior edges of said optical coupler are joined to said die chip using a sealant, and wherein the air gap is maintained to be free of the sealant.

* * * * *